(12) United States Patent
Wang et al.

(10) Patent No.: US 12,483,082 B1
(45) Date of Patent: Nov. 25, 2025

(54) THIN MOTOR JOINT MODULE

(71) Applicants: Shenzhen Komo Innovation Robotics Technology Co., Ltd., Shenzhen (CN); MAIN DRIVE CORPORATION, Miaoli (TW)

(72) Inventors: Zhigen Wang, Shenzhen (CN); Youchuan Wei, Shenzhen (CN); Shih-Yao Shen, Shenzhen (CN)

(73) Assignees: Shenzhen Komo Innovation Robotics Technology Co., Ltd., Shenzhen (CN); MAIN DRIVE CORPORATION, Miaoli (TW)

( * ) Notice: Subject to any disclaimer, the term of this patent is extended or adjusted under 35 U.S.C. 154(b) by 0 days.

(21) Appl. No.: 19/216,915

(22) Filed: May 23, 2025

(30) Foreign Application Priority Data

Mar. 14, 2025  (CN) .......................... 202510304530.3

(51) Int. Cl.
*H02K 5/02* (2006.01)
*B25J 9/10* (2006.01)
(Continued)

(52) U.S. Cl.
CPC .............. *H02K 5/02* (2013.01); *B25J 9/1025* (2013.01); *F16H 49/001* (2013.01); *F16H 57/029* (2013.01); *F16H 57/032* (2013.01); *H02K 5/10* (2013.01); *H02K 7/003* (2013.01); *H02K 7/116* (2013.01); *H02K 11/33* (2016.01); *H02K 21/24* (2013.01); *F16H 2057/02034* (2013.01); *F16H 2057/02073* (2013.01)

(58) Field of Classification Search
CPC . H02K 5/02; H02K 11/33; H02K 5/10; H02K 7/003; H02K 7/116; H02K 21/24; B25J 9/1025; F16H 49/001; F16H 57/029; F16H 57/032; F16H 2057/02034; F16H 2057/02073
See application file for complete search history.

(56) References Cited

U.S. PATENT DOCUMENTS

2020/0292046 A1* 9/2020 Imagawa ................. B25J 9/102

FOREIGN PATENT DOCUMENTS

| CN | 116803621 A | * | 9/2023 | ............ B25J 9/1025 |
| CN | 114732524 B | | 1/2025 | |

(Continued)

*Primary Examiner* — Zakaria Elahmadi
(74) *Attorney, Agent, or Firm* — JEEN IP LAW, LLC

(57) ABSTRACT

A thin motor joint module is provided, which includes a power component, a gear reducer component, and an output component, the power component, the gear reducer component, and the output component are all provided in a housing. The power component is provided with an axial magnetic flux motor, the gear reducer component is provided with a harmonic reducer, and the housing is composed of lightweight metal materials and PEEK materials. The advantage of the present disclosure is that the axial magnetic flux motor is provided in the power component. Compared with traditional radial magnetic flux motors, the axial magnetic flux motor is flatter and outputs a larger torque, which can reduce an axial length of the joint module and ensure a larger output torque. The housing is made of lightweight metal materials and PEEK materials, thus forming a high torque, high energy density, and lightweight joint module.

8 Claims, 10 Drawing Sheets

(51) Int. Cl.
*F16H 49/00* (2006.01)
*F16H 57/029* (2012.01)
*F16H 57/032* (2012.01)
*H02K 5/10* (2006.01)
*H02K 7/00* (2006.01)
*H02K 7/116* (2006.01)
*H02K 11/33* (2016.01)
*H02K 21/24* (2006.01)
*F16H 57/02* (2012.01)

(56) References Cited

FOREIGN PATENT DOCUMENTS

| | | | | | |
|---|---|---|---|---|---|
| EP | 3868591 | A1 | * | 8/2021 | ............. H02K 21/02 |
| WO | WO-2021062637 | A1 | * | 4/2021 | ............. B25J 11/00 |

* cited by examiner

THIN MOTOR JOINT MODULE

CROSS-REFERENCE TO RELATED APPLICATIONS

This application claims priority to Chinese Patent Application No. 202510304530.3, filed on Mar. 14, 2025, which is hereby incorporated by reference in its entirety.

TECHNICAL FIELD

The present disclosure relates to the field of joint module technologies, and in particular, to a thin motor joint module.

BACKGROUND

Joint module is a compact modular product that integrates key components such as motors, reducers, encoders, and drivers. It is widely used in fields such as robotics, medical equipment, and consumer electronics. Because joint modules need to bear a large amount of weight during use, the joint modules are generally used in places with limited space. Therefore, the joint modules are often required to have a small volume, high torque, and light weight. If these three requirements can be achieved simultaneously, the joint modules will be able to adapt to more application scenarios.

CN114732524B, entitled with a rotating joint module, which discloses that the support sleeve, brake block, and encoder support frame are all made of iron shielding materials, which can effectively shield the influence of external magnetic fields on the magnetic ring. At the same time, the motor housing is also made of iron material, which can effectively shield the magnetic field leakage of the torque motor and further shield the influence on the encoder magnetic ring. The motor housing is made of iron material, and the wall thickness can be made thinner, which can further achieve a compact structure. The connecting sleeve is also made of steel material, which can effectively shield the magnetic field and achieve a good electromagnetic shielding effect on the communication cables inside the connecting sleeve.

From the above disclosure, the components of the joint module are mostly made of iron materials, which renders the weight of the joint module unable to be reduced, which will result in the joint module being bulky and requiring the driving motor to spend a lot of force to drive the components of the joint module itself. Therefore, requirements for the driving motor are high, and some of the energy output by the driving motor will be wasted.

SUMMARY

The present disclosure overcomes the shortcomings of the prior art by incorporating an axial magnetic flux motor in a power component. Compared to traditional radial magnetic flux motors, the axial magnetic flux motor is flatter and outputs greater torque, thereby reducing an axial length of the joint module and ensuring a larger output torque. The housing is made of lightweight metal materials and PEEK materials, rendering the joint module more lightweight and increasing an output ratio of the motor, thus forming a high torque, high energy density, and lightweight joint module.

In order to solve the above technical problems, the present disclosure is implemented through the following technical solutions.

A thin motor joint module, including a power component, a gear reducer component, and an output component, where the power component, the gear reducer component, and the output component are all provided in a housing; the power component is provided with an axial magnetic flux motor, the gear reducer component is provided with a harmonic reducer, and the housing is composed of lightweight metal material and PEEK material.

In some embodiments of the present disclosure, the housing includes a first housing, a second housing, and a third housing; the first housing is wrapped around the power component, the first housing is made of lightweight metal material; the second housing is wrapped around an outer periphery of the gear reducer component, the third housing is wrapped around an outer periphery of the output component, both the second housing and the third housing are made of PEEK material.

In some embodiments of the present disclosure, the power component is further provided with a dual encoder and a driver.

In some embodiments of the present disclosure, the harmonic reducer includes a camshaft, the camshaft is connected to a flexible bearing, the flexible bearing is connected to a flexible wheel, and the flexible wheel is meshed with a rigid wheel;

the camshaft is connected to the power component, the rigid wheel is connected to the gear reducer component, and the flexible wheel is connected to the output component.

In some embodiments of the present disclosure, a first O-ring is provided between the rigid wheel and a rigid wheel front cover, and a second O-ring is provided between the rigid wheel and the second housing.

In some embodiments of the present disclosure, a second oil seal is provided between the gear reducer component and the power component, and a first oil seal is provided between the gear reducer component and the output component.

In some embodiments of the present disclosure, the output component is provided with a torque sensor, and a connecting sealing cover is provided on one side of the torque sensor that is close to the gear reducer component; the first oil seal is provided at an outer periphery of the connecting sealing cover, and the other side of the torque sensor is connected to an output flange; an outer periphery of the output flange is connected to a cross roller bearing, and the cross roller bearing is connected to the third housing.

In some embodiments of the present disclosure, the output flange is made of PEEK material.

In some embodiments of the present disclosure, a hollow shaft penetrates centers of the power component, the gear reducer component, and the output component, and an output shaft locking ring is provided between the hollow shaft and the flexible wheel, and a third O-ring is provided between the output shaft locking ring and the hollow shaft.

Compared with the existing technology, the beneficial effects of the present disclosure are as follows.

The power component is provided with an axial magnetic flux motor, which is flatter and outputs a larger torque compared to traditional radial magnetic flux motors.

Therefore, it can reduce an axial length of the joint module and ensure a larger output torque. The housing is made of lightweight metal material and PEEK material, rendering the joint module lighter and increasing an output ratio of the motor, thereby forming a high torque, high energy density, and lightweight joint module.

BRIEF DESCRIPTION OF DRAWINGS

The accompanying drawings are used to provide a further understanding of the present disclosure and together with the embodiments of the present disclosure, to explain the present disclosure, and do not constitute a limitation of the present disclosure.

Numeral reference: 1—power component; 101—driver; 102—dual encoder; 103—axial magnetic flux motor; 2—gear reducer component; 201—harmonic reducer; 2011—flexible wheel; 2012—flexible bearing; 2013—camshaft; 2014—rigid wheel; 202—first O-ring; 203—second O-ring; 204—third O-ring; 205—rigid wheel front cover; 3—output component; 301—torque sensor; 302—cross roller bearing; 303—output flange; 304—connecting sealing cover; 4—hollow shaft; 401—first rubber cap bearing; 402—second rubber cap bearing; 403—output shaft locking ring; 5—first housing; 6—second housing; 7—third housing; 8—first oil seal; 9—second oil seal.

DESCRIPTION OF EMBODIMENTS

The preferred embodiments of the present disclosure are described below in combination with the accompanying drawings. It should be noted that the preferred embodiments described herein are only for illustrating and explaining the present disclosure, and are not intended to limit the present disclosure.

Figure 1:
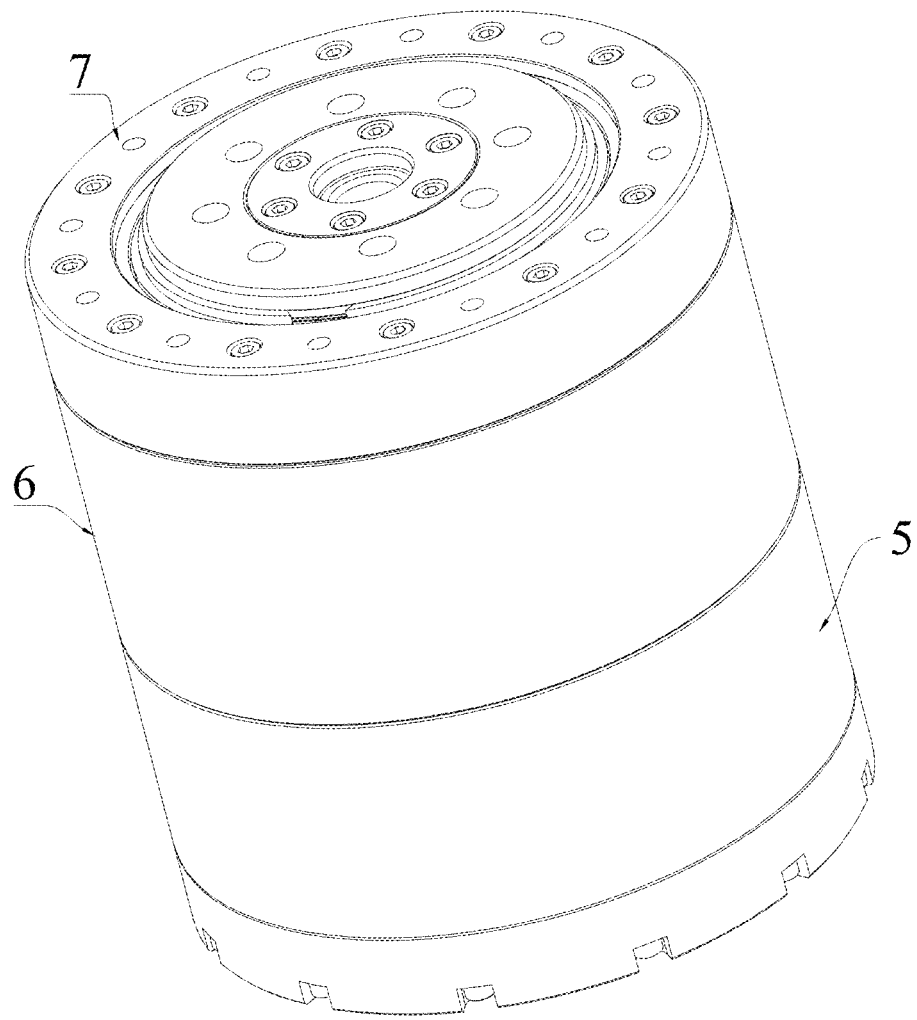
FIG. 1 is an overall schematic diagram of a joint module according to an embodiment of the present disclosure.
Figure 2:
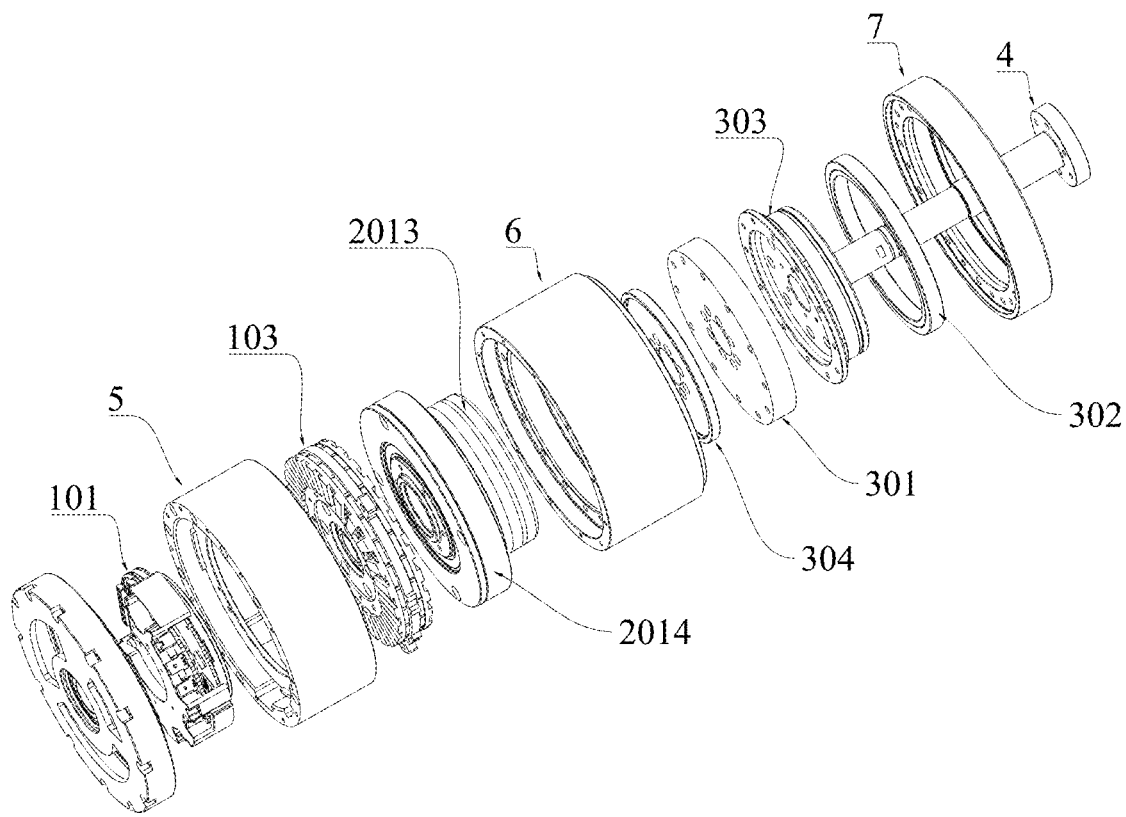
FIG. 2 is a first explosive schematic diagram of the joint module in an embodiment of the present disclosure.
Figure 3:
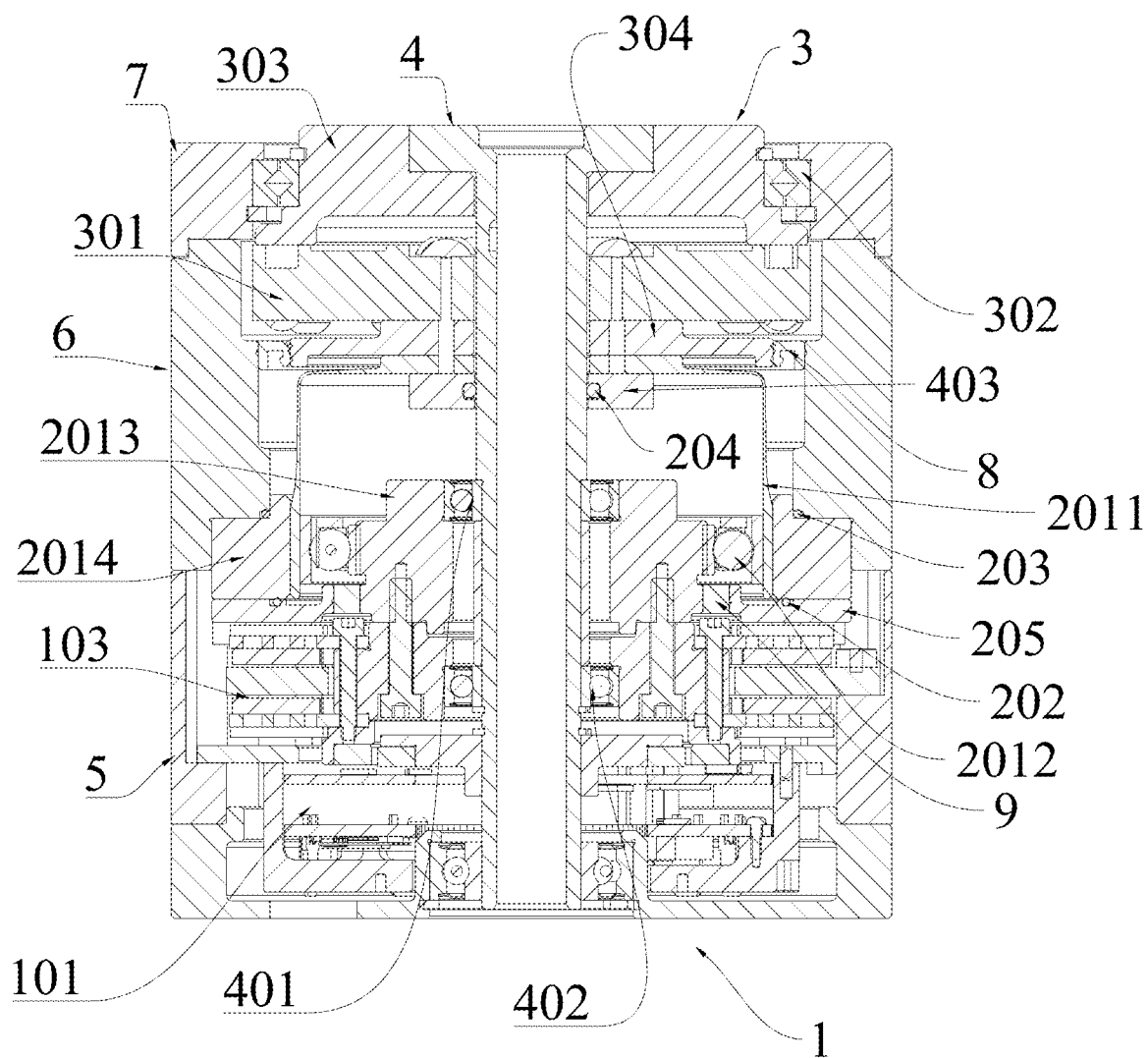
FIG. 3 is a cross-sectional view of the joint module according to an embodiment of the present disclosure.
Figure 4:
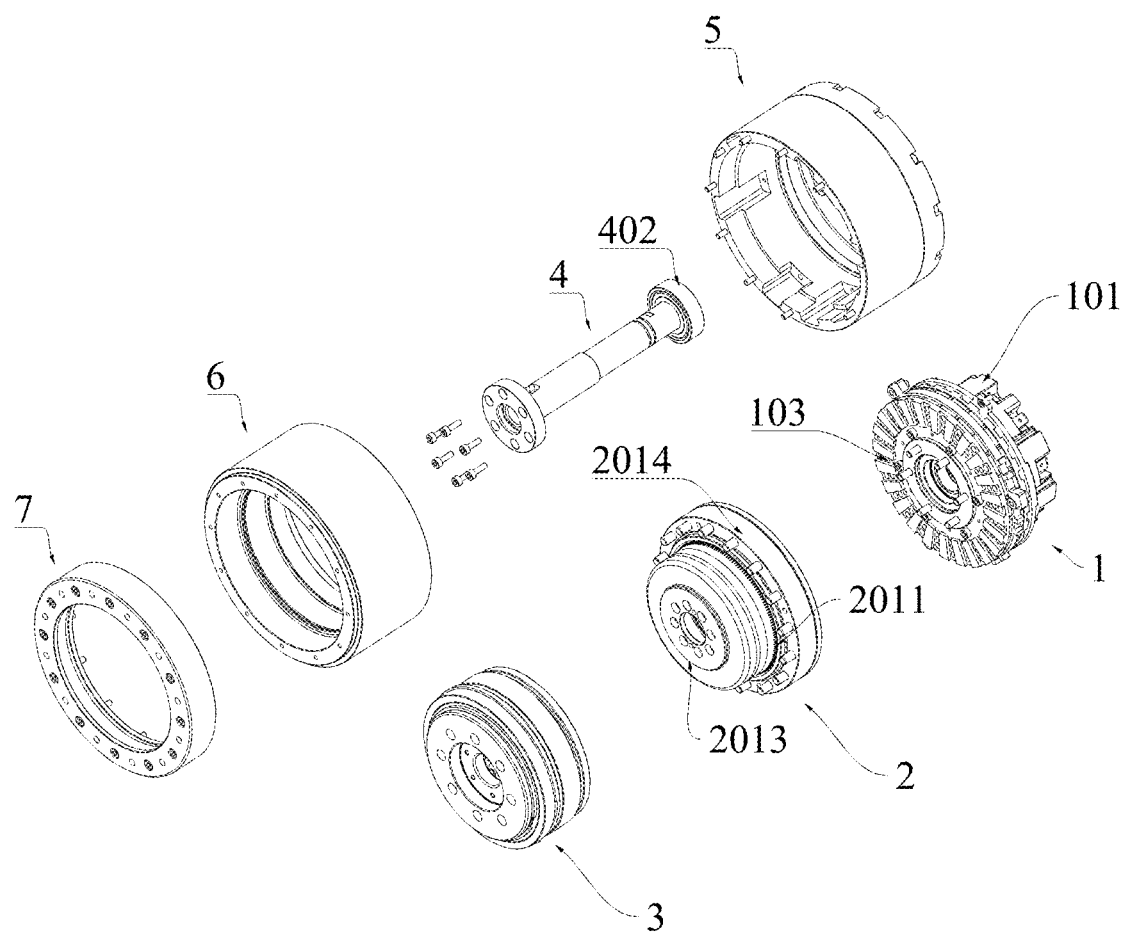
FIG. 4 is a second explosive schematic diagram of the joint module in an embodiment of the present disclosure.
Figure 5:
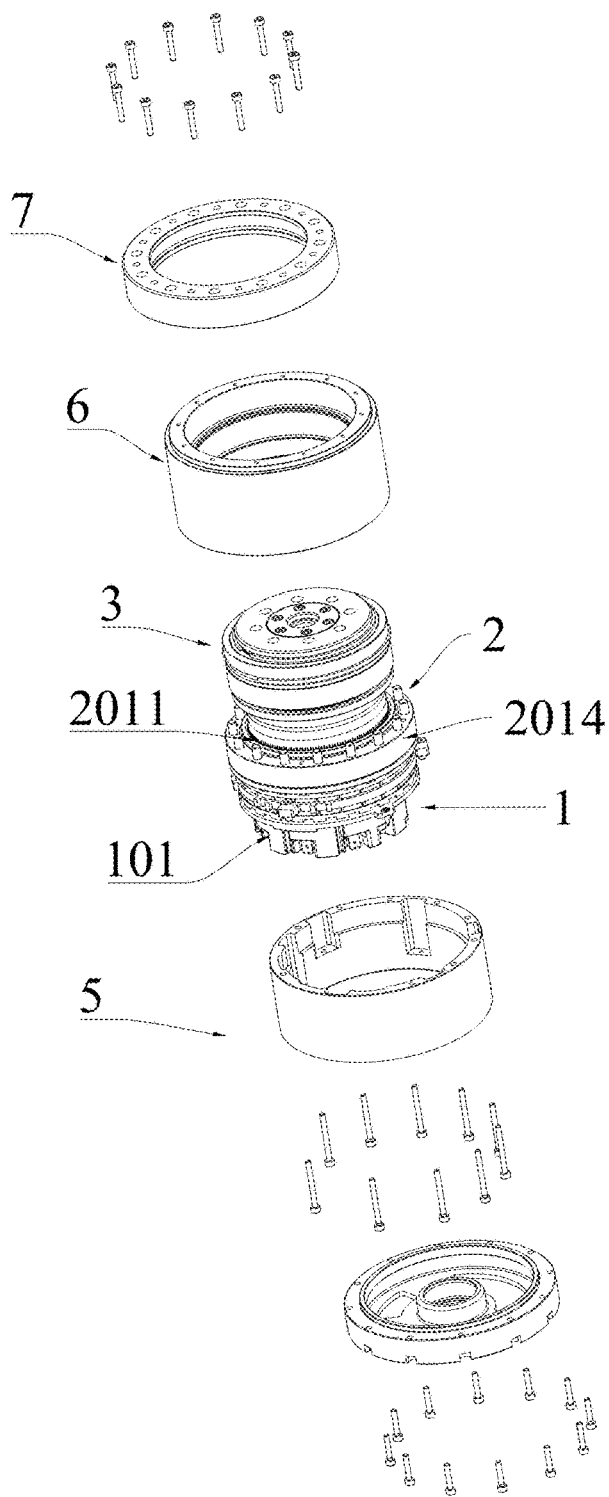
FIG. 5 is a third explosive schematic diagram of the joint module in an embodiment of the present disclosure.
Figure 6:
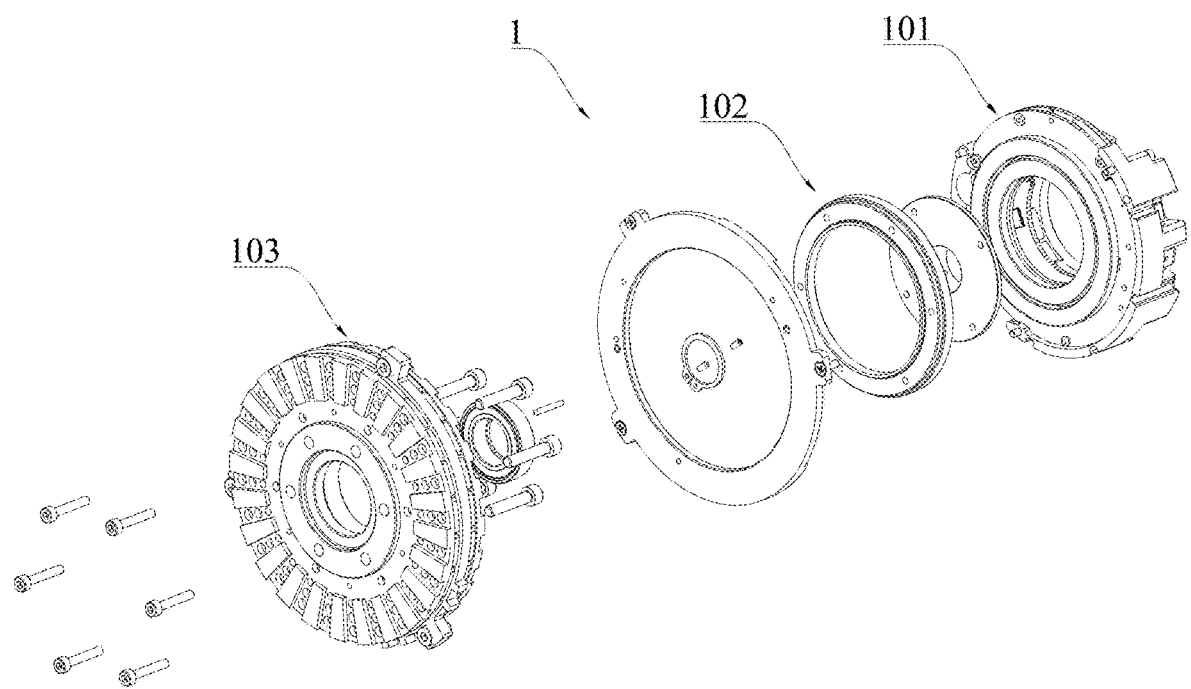
FIG. 6 is an explosive schematic diagram of a power component in an embodiment of the present disclosure.
Figure 7:
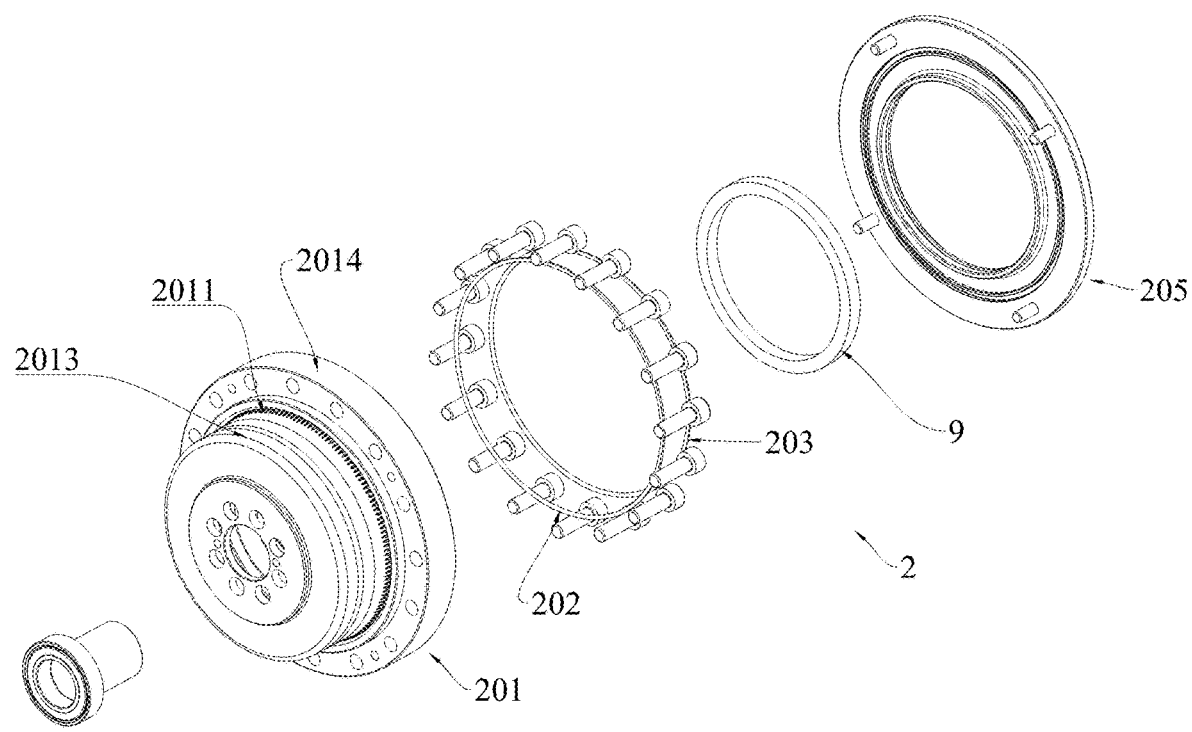
FIG. 7 is an exploded schematic diagram of a gear reducer component according to an embodiment of the present disclosure.
Figure 8:
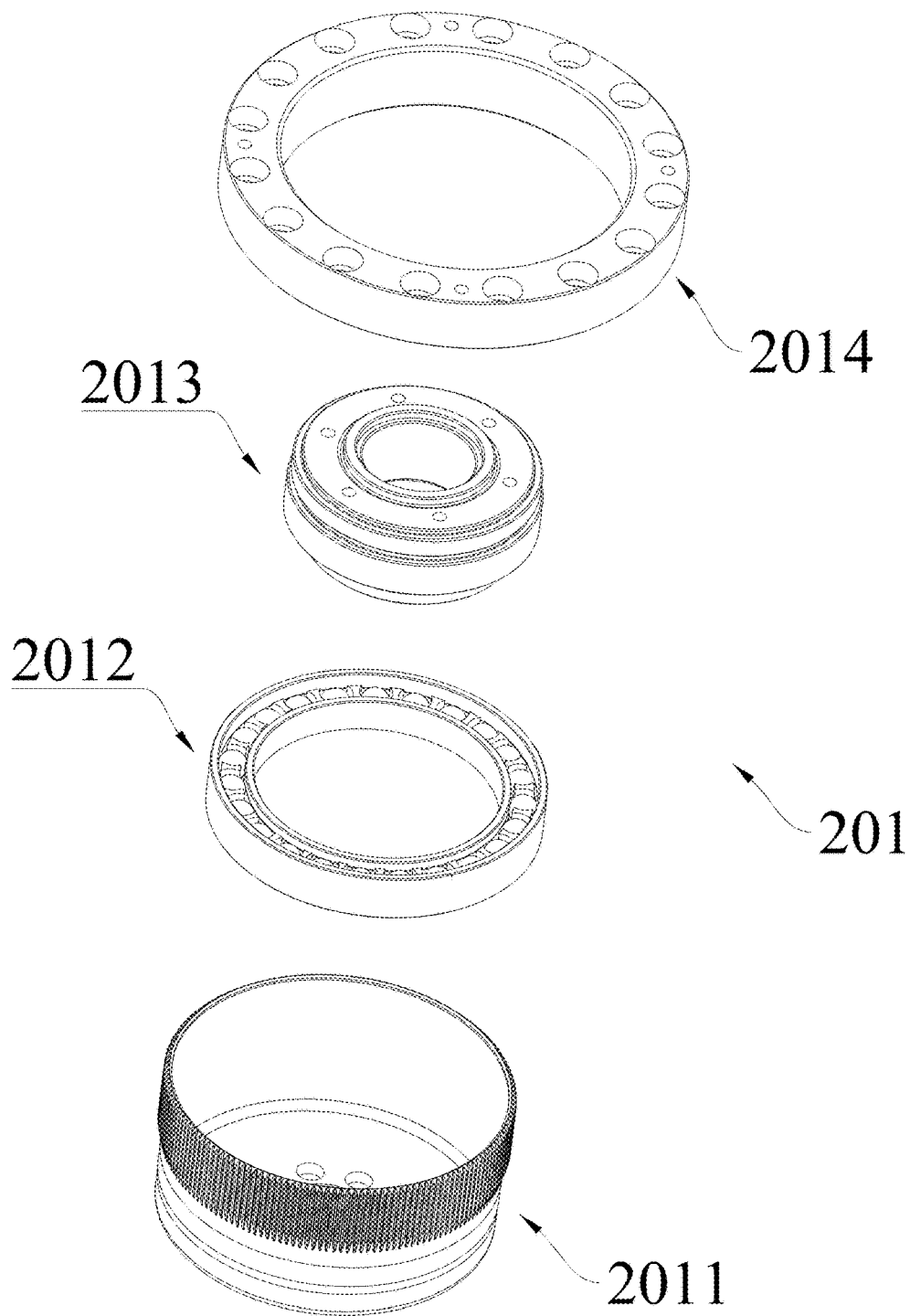
FIG. 8 is an exploded schematic diagram of a harmonic reducer according to an embodiment of the present disclosure.
Figure 9:
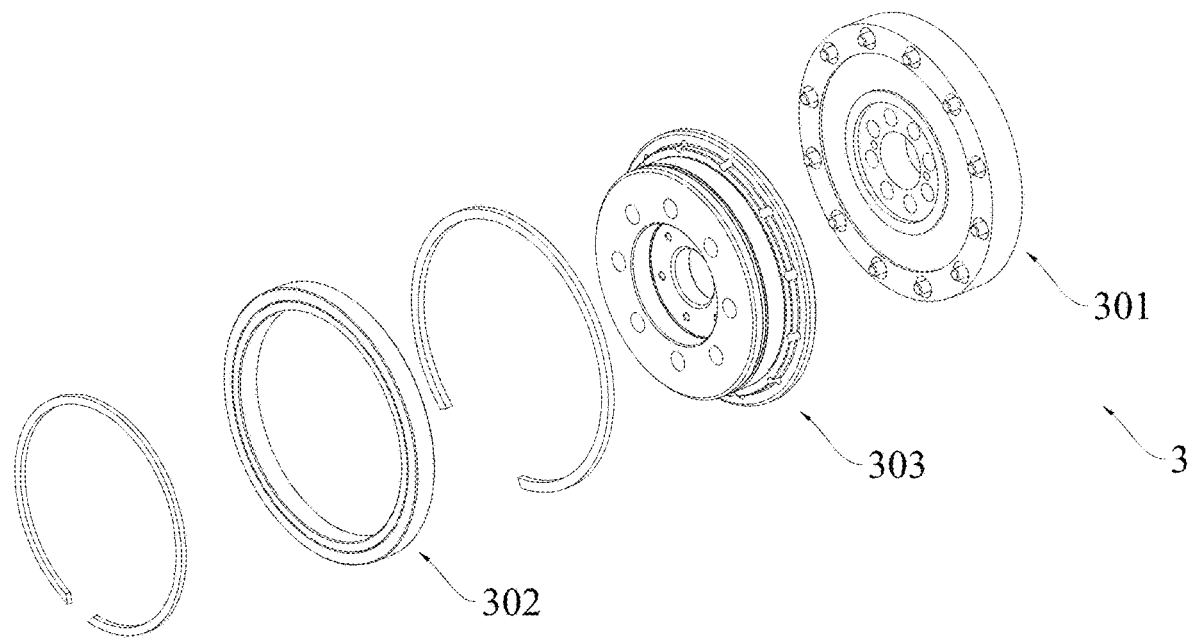
FIG. 9 is a first explosive schematic diagram of an output component in an embodiment of the present disclosure.
Figure 10:
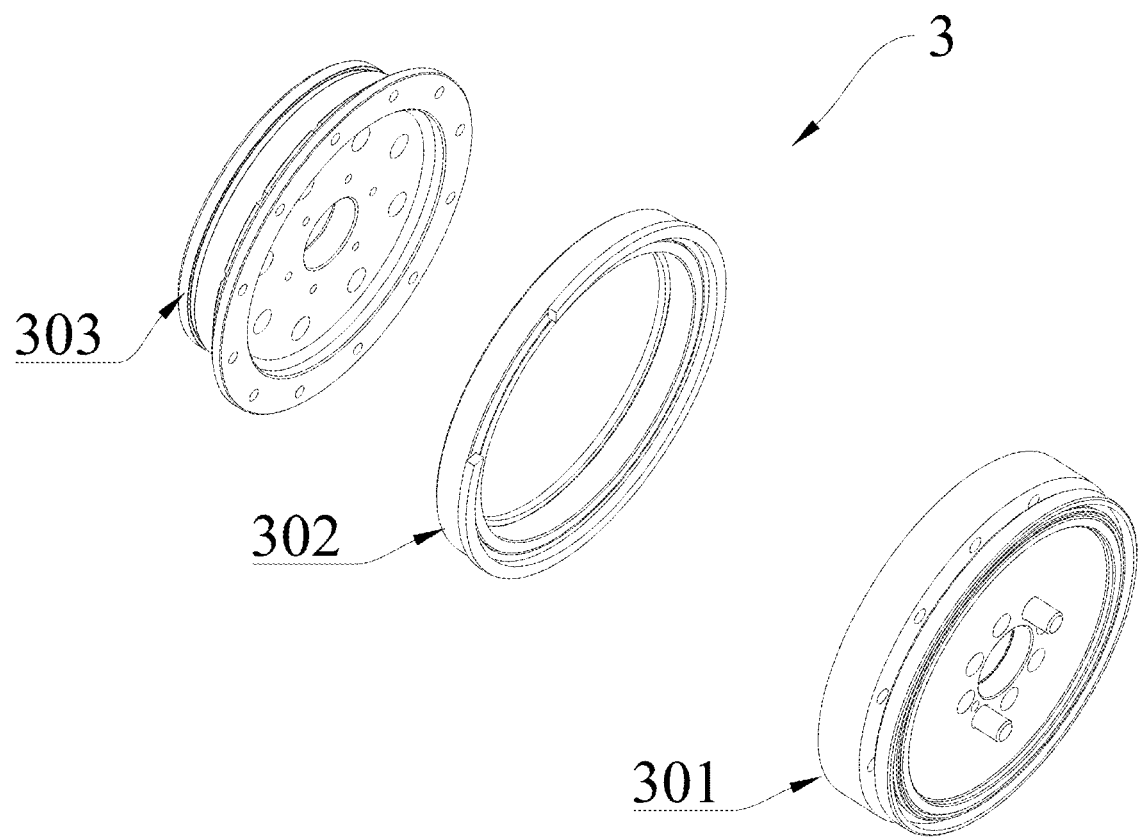
FIG. 10 is a second explosive schematic diagram of the output component in an embodiment of the present disclosure.

As shown in FIGS. 1 to 10, a thin motor joint module includes a power component 1, a gear reducer component 2, and an output component 3; the power component 1, the gear reducer component 2, and the output component 3 are all provided in a housing. Therefore, it forms a joint module with high torque, high energy density, and lightweight.

The power component 1 is provided with an axial magnetic flux motor 103, the axial magnetic flux motor 103 is different from traditional radial magnetic flux motors in that it includes a stator in a middle and two rotors arranged at front and back along an axial direction. The axial magnetic flux motor 103 has characteristics of a flat structure, high power density, high torque output, and high efficiency, which can greatly shorten a length of the joint module and increase the torque, rendering a steering power of the joint module to be better. The gear reducer component 2 is provided with a harmonic reducer 201, and the housing is made of lightweight metal material and PEEK material, which makes the joint module lighter and improves the torque to weight ratio (output torque/module weight) of the joint module, thus the power output can be fully used by the axial magnetic flux motor 103. The housing includes a first housing 5, a second housing 6, and a third housing 7. The first housing 5 is wrapped around an exterior of the power component 1 and is made of lightweight metal material with high thermal conductivity, which can quickly dissipate heat generated by the power component 1.

The second housing 6 is wrapped around an outer periphery of the gear reducer component 2, and the third housing 7 is wrapped around an outer periphery of the output component 3. Both the second housing 6 and the third housing 7 are made of PEEK (Polyether Ether Ketone) material, the PEEK material, is a high-performance polymer material with excellent high temperature resistance, chemical stability, mechanical properties, wear resistance, insulation performance, and biocompatibility. Therefore, the second housing 6 and the third housing 7 not only provide protection for the gear reducer component 2 and the output component 3, but also lightweight the entire joint module.

The PEEK material can render the second housing 6 to be thinner, allowing for more space to be reserved inside the second housing 6. This maximizes the size of the harmonic reducer 201 within a limited space, thereby increasing the energy density of the joint module and enabling it to output greater torque.

The power component 1 is further provided with a dual encoder 102 and a driver 101, the driver 101 is integrated with the dual encoder 102 so as to provide high-precision angular positioning and reduce an axial thickness.

The harmonic reducer 201 includes a camshaft 2013, the camshaft 2013 is connected to a flexible bearing 2012. The flexible bearing 2012 is connected to a flexible wheel 2011, and the flexible wheel 2011 is meshed with a rigid wheel 2014; the camshaft 2013 is connected to the power component 1, the rigid wheel 2014 is connected to the gear reducer component 2, and the flexible wheel 2011 is connected to the output component 3.

The power component 1 drives the camshaft 2013 to rotate, ultimately transmitting power to the flexible wheel 2011, and finally outputting power from the output component 3.

A first O-ring 202 is provided between the rigid wheel 2014 and a rigid wheel front cover 205, a second O-ring 203 is provided between the rigid wheel 2014 and the second housing 6, an output shaft locking ring 403 is provided between a hollow shaft 4 and the flexible wheel 2011, and a third O-ring 204 is provided between the output shaft locking ring 403 and the hollow shaft 4. A second oil seal 9 is provided between the gear reducer component 2 and the power component 1, and a first oil seal 8 is provided between the gear reducer component 2 and the output component 3. The first O-ring 202, the second O-ring 203, the third O-ring 204, the first oil seal 8, and the second oil seal 9 allow lubricating grease to only flow inside the gear reducer component 2, thereby ensuring a smooth operation of the flexible wheel 2011 and the rigid wheel 2014, and preventing the lubricating grease from flowing to other areas, which will causes grease loss and affecting the operation of electronic components.

The output component 3 is provided with a torque sensor 301, and one side of the torque sensor 301 that is close to the gear reducer component 2 is connected to a connecting sealing cover 304. The first oil seal 8 is provided at an outer periphery of the connecting scaling cover 304, and the other side of the torque sensor 301 is connected to an output flange 303. An outer periphery of the output flange 303 is connected to a cross roller bearing 302, and the cross roller bearing 302 is connected to the third housing 7, the third housing 7 is connected to the second housing 6. The second housing is connected to the rigid wheel 2014, and the flexible wheel 2011 is meshed with the rigid wheel 2014 for reverse rotation. Therefore, the cross roller bearing 302 serves as a connecting component for the linkage between the flexible wheel 2011 and the rigid wheel 2014. The cross roller bearing 302 can simultaneously bear axial loads, radial loads, and overturning moments, thereby enhancing the stability of the joint module structure and operation.

The output flange 303 is made of PEEK material, which is different from traditional metal materials. The output flange 303 is more lightweight.

Centers of the power component 1, the gear reducer component 2, and the output component 3 are penetrated by the hollow shaft 4, the hollow shaft 4 unifies each component in the axial direction and enhances the overall structure of the joint module. There are threading holes on a side wall of the hollow shaft 4. The hollow shaft 4 connects a first rubber cap bearing 401 and a second rubber cap bearing 402. The first rubber cap bearing 401 is connected to the gear reducer component 2, and the second rubber cap bearing 402 is connected to the power component 1. The first rubber cap bearing 401 and the second rubber cap bearing 402 also play a role in preventing lubricating grease from flowing to other areas during operation.

The torque sensor 301 uses a hollow shaft 4 to pull a signal line to a rear end for the driver 101 so as to read torque information, which can be used by a user to make a control compensation according to needs. Therefore, the hollow shaft 4 plays an essential role in component connection and communication.

Finally, it should be noted that the above are only preferred embodiments of the present disclosure and are not intended to limit the present disclosure. Although the present disclosure has been described in detail with reference to the embodiments, it is still possible for those skilled in the art to modify the technical solutions described in the aforementioned embodiments or to make equivalent substitutions for some of the technical features. However, any modifications, equivalent substitutions, improvements, etc. made within the spirit and principles of the present disclosure should be included within the protection scope of the present disclosure.

What is claimed is:

1. A thin motor joint module, comprising a power component, a gear reducer component, and an output component,
   wherein the power component, the gear reducer component, and the output component are all provided in a housing;
   the power component is provided with an axial magnetic flux motor, the gear reducer component is provided with a harmonic reducer, and the housing is composed of lightweight metal material and PEEK material;
   wherein the harmonic reducer comprises a camshaft, the camshaft is connected to a flexible bearing, and the flexible bearing is connected to a flexible wheel;
   wherein a hollow shaft penetrates centers of the power component, the gear reducer component, and the output component; and an output shaft locking ring is provided between the hollow shaft and the flexible wheel, and a third O-ring is provided between the output shaft locking ring and the hollow shaft.

2. The thin motor joint module according to claim 1, wherein the housing comprises a first housing, a second housing, and a third housing;
   the first housing is wrapped around the power component, the first housing is made of lightweight metal material;
   the second housing is wrapped around an outer periphery of the gear reducer component, the third housing is wrapped around an outer periphery of the output component, both the second housing and the third housing are made of PEEK material.

3. The thin motor joint module according to claim 2, wherein the power component is further provided with a dual encoder and a driver.

4. The thin motor joint module according to claim 2, wherein the flexible wheel is meshed with a rigid wheel;
   the camshaft is connected to the power component, the rigid wheel is connected to the gear reducer component, and the flexible wheel is connected to the output component.

5. The thin motor joint module according to claim 4, wherein a first O-ring is provided between the rigid wheel and a rigid wheel front cover, and a second O-ring is provided between the rigid wheel and the second housing.

6. The thin motor joint module according to claim 5, wherein a second oil seal is provided between the gear reducer component and the power component, and a first oil seal is provided between the gear reducer component and the output component.

7. The thin motor joint module according to claim 6, wherein the output component is provided with a torque sensor, and a connecting sealing cover is provided on one side of the torque sensor that is close to the gear reducer component;
   the first oil seal is provided at an outer periphery of the connecting sealing cover, and the other side of the torque sensor is connected to an output flange;
   an outer periphery of the output flange is connected to a cross roller bearing, and the cross roller bearing is connected to the third housing.

8. The thin motor joint module according to claim 7, wherein the output flange is made of PEEK material.

* * * * *